March 3, 1942. E. H. WALLACE 2,274,855
PNEUMATIC TIRE
Filed Jan. 29, 1938.
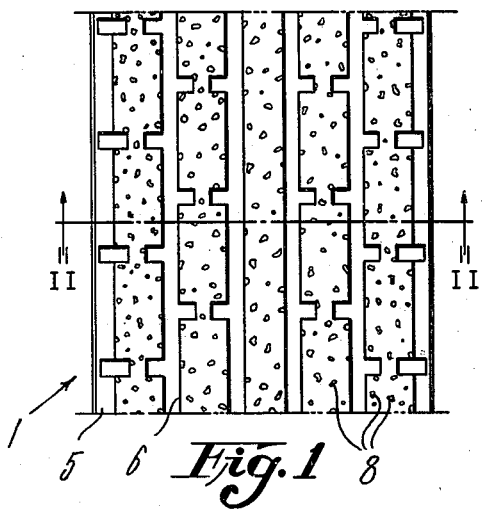
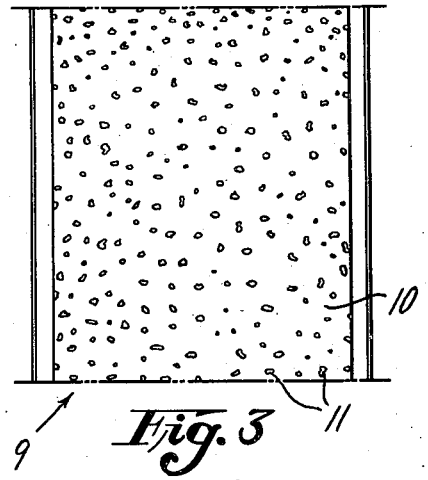
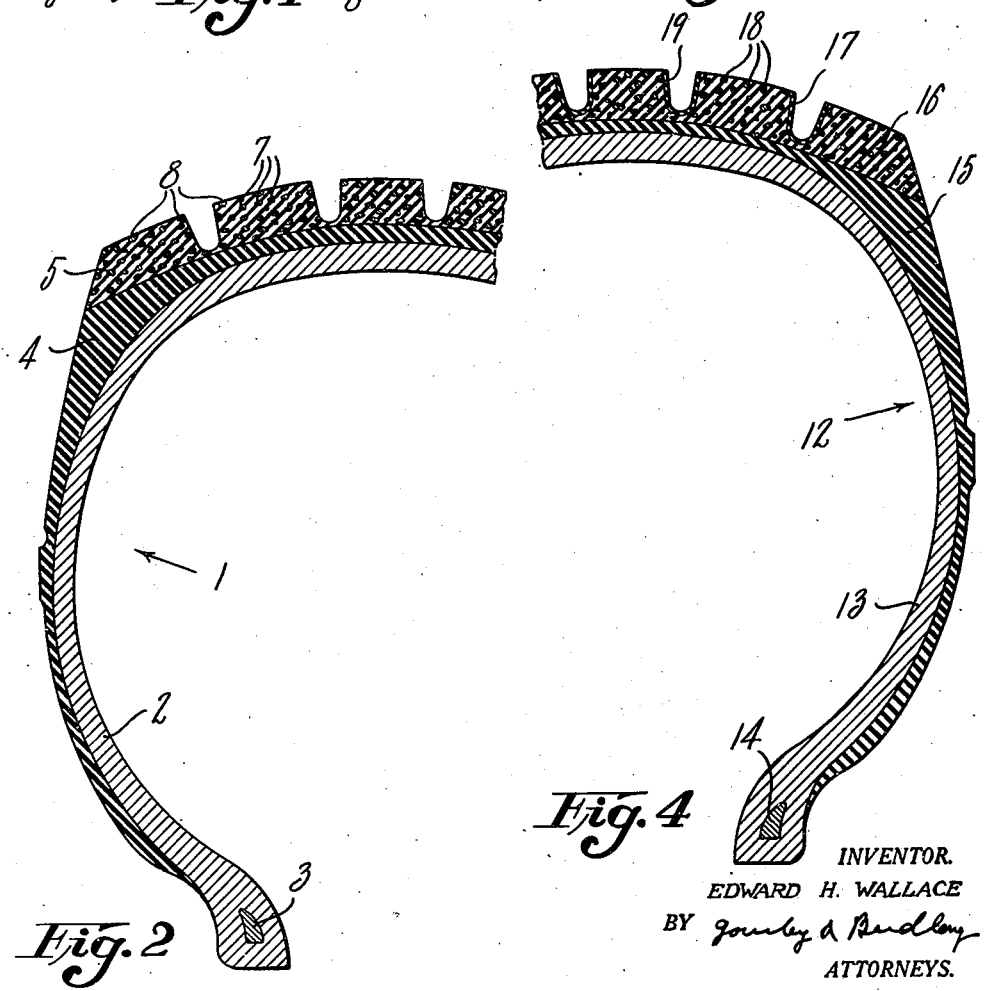
INVENTOR.
EDWARD H. WALLACE
BY *Gourley & Bradley*
ATTORNEYS.

Patented Mar. 3, 1942

2,274,855

UNITED STATES PATENT OFFICE 2,274,855

PNEUMATIC TIRE

Edward H. Wallace, Detroit, Mich., assignor, by mesne assignments, to United States Rubber Company, New York, N. Y., a corporation of New Jersey Application January 29, 1938, Serial No. 187,652

2 Claims. (Cl. 152—209)

This invention relates to pneumatic tires, and in particular to the incorporation of salt crystals of the halide group therein for improvement of the anti-skid characteristics of the tires.

It has heretofore been proposed to embed in tire threads soluble materials of an organic nature such as sawdust, plant seeds, various forms of starch, including vermicelli, and the like. These materials were supposed to dissolve or loosen during the wear of the tire to form cavities in the exposed face of the rubber. However, it has been found that such organic material tend to swell when moistened thereby causing them to become more firmly embedded in the rubber. Accordingly, the rubber has to be worn down to a considerable degree before such organic materials are released. This is especially true under conditions of a wet road where it is desired to have the cavities open quickly, but because of the expansion caused by the wetting of the materials the organic materials are more firmly embedded.

Organic materials of a starchy nature, which have heretofore been used, tend to form a pasty film upon dissolution. This film serves as a further road "lubricant."

I have found that inorganic materials as herein described, such as crystals of the halide group, are particularly useful for forming cavities in tire treads by dissolution. Such crystals dissolve rapidly upon exposure to moisture without expansion. This property renders them particularly useful in tread rubber since they readily drop out of the rubber when exposed to moisture to form the desired cavities. Also the brine formed upon the dissolution is not of a pasty nature, but rather it acts to neutralize certain of the elements normally present in road "lubricants" thereby further improving the traction characteristics of the tires.

The accompanying drawing illustrates several preferred forms of tires embodying my invention, in which:

Fig. 1 is a fragmentary plan view of a pneumatic tire embodying the features of my invention;

Fig. 2 is a fragmentary view, in section, of the tire shown in Fig. 1;

Fig. 3 is a fragmentary plan view of a modified pneumatic tire, illustrating an embodiment of my invention; and Fig. 4 is a fragmentary view of a further modified tire, in section, illustrating an embodiment of my invention.

Referring to the accompanying drawing, and in particular to Figs. 1 and 2, I show an embodiment of my invention in the form of a pneumatic tire 1, comprising a carcass 2, inextensible bead elements 3, a sub-tread portion 4 and a tread portion 5 in which an antiskid configuration may be formed. The antiskid configuration may assume the form of any conventional tread design, such as a rib and block design defined by grooves 6. The wear portion of the tread has crystals of salt 7 uniformly interspersed throughout its mass. As it is desirable to restrict the salt crystals to the wear portion of the tread, the tread is divided into the sub-tread portion 4 and the tread portion 5.

The salt crystals are preferably of such a size and degree of uniformity as to pass through a 10-mesh sieve, but to be retained by a 20-mesh sieve. The salt crystals of this size are milled into the uncured rubber compound to assure uniform interspersion of the crystals throughout the compound.

Rock salt crystals, as, sodium chloride, are preferred for use in the tread portion 5; although other of the halide salts of sodium or potassium, in addition to salts of citric acid, may be effectively employed. These salts are recited by way of illustration, since it is not intended that the invention be limited to use of the same. Use of salts other than the salts enumerated, however, is limited to those which are soluble in water, which maintain their crystalline structure reasonably well during mixing with the rubber compound and throughout the process of vulcanization, do not swell during dissolution, and do not form a pasty film upon dissolution.

The crystals used in the tread portion 5, being of such a degree of fineness and uniformity, do not interfere with extrusion of the tread rubber, so that in building a tire of the present invention the tread portions 4 and 5 may be readily assembled and vulcanized in adhesion with each other.

In general, the tire is assembled in substantially the same manner as a conventional tire utilizing a two piece tread. The different treads may be assembled in separate operations, or they may be merged together as a single tread in a dual extrusion operation.

The quantity of crystals employed in the tread portion of the tire may vary. However, I find that good results are obtained by proportioning the tread portion to 30 percent crystals and 70 percent rubber composition. Also, the proportion of crystals may be within the range of 20 percent to 40 percent while still maintaining an improved quality in the tread. If desired, the crystals may be in the form of preformed pellets.

During use of a tire constructed in accordance with the principles of the present invention, particularly on a wet road surface, those salt crystals which are at the surface of the tread are dissolved without swelling so that they readily fall out of the rubber leaving exposed cavities. The salt brine formed upon the dissolution of the crystals is not of a pasty nature and does not form a road "lubricant." As a matter of fact, the salt brine acts to neutralize certain of the elements of common road "lubricants," thereby improving tire traction. It is believed that the walls of the numerous additional cavities provide cutting edges for wiping the film of water on the road surface, and enable the tire to increase its effective frictional contact with the road surface, particularly during a braking operation.

By constant friction of the tread during use, the surface thereof is gradually worn down; and, as the cavities provided by crystals at the surface disappear or become ineffective, the salt crystals farther below the initial surface become exposed and allow new cavities to be formed. In this way, the effective antiskid property of this type of tire is constant during the effective life of same. Fig. 1 illustrates a section of the surface of a conventional block chain antiskid construction in which a multiplicity of cavities 8 formed by the salt crystals are apparent. It will be noted that the size of these cavities 8 is generally uniform. It will also be noted that the cavities 8 appear principally on those surfaces of the tread which contact with the road surface, since ordinarily a slight amount of wear thereon is desirable in order to expose the crystals.

The idea of incorporating salt crystals in the tread of a tire may be utilized in connection with tires having a plain tread. An example of this modification of the invention is shown in Fig. 3 in which a tire 9 having a plain tread 10 is provided with a multiplicity of cavities 11 resulting from dissolved crystals incorporated in the tread.

One of the difficulties experienced with tires of conventional construction is that of cracking at the base of the grooves defining the antiskid configuration. This difficulty may be accentuated where crystals and/or cavities appear at the surface of the base of the tread grooves. As cracking at the base of the grooves is believed to be aggravated by ozone in the atmosphere, it is advisable to protect the surface of the base of the grooves. In Fig. 4 is shown a tire 12 comprising a carcass 13, inextensible bead elements 14, a sub-tread portion 15, and a tread portion 16. An antiskid configuration in the form of a plurality of circumferentially extending grooves 17 defining ribs is formed in the tread portion 16. Similar to that previously described, the tread portion 16 includes a mixture of salt crystals 18.

In order to protect the groove bases from the influence of ozone, I protect the surface thereof by providing a layer 19 of rubber composition. This layer 19 may be united to the surface of the grooves by a cementing operation, or it may be assembled as individual strips to the tread portion 16 before the tire is vulcanized. In the latter method the rubber will merge in integral relation with the tread portion during the molding operation.

Actual test results have shown that a tire tread of the present invention possesses definitely superior properties in traction and antiskid qualities in comparison with similar sized conventional tires and with tire treads having inserts of a starchy nature. These improvements were evident under various road conditions, such as wet road surfaces, roads covered with loose snow, and roads covered with hard packed snow.

In tires embodying features of my invention, the increased efficiency of the tires is desired when the tires are operating on wet road surfaces. Consequently, the unique feature of providing water soluble material of a saline nature in the tread results in the tire becoming more effective at that critical period of its operation.

While certain preferred embodiments of the invention have been shown and described, it will be understood that modifications may be made therein without departing from the spirit of the invention or the scope of the appended claims.

Having thus described my invention, what I claim and desire to protect by Letters Patent is:

1. In a pneumatic tire, a tread comprising a layer of rubber composition having a plurality of circumferentially extending grooves defining continuous ribs, a quantity of water soluble inorganic halide salt interspersed as small particles in the said layer, and thin homogeneous layers of rubber composition secured to said tread at least in the regions of the bases of the grooves so as to completely enclose the water soluble particles adjacent said grooves.

2. In a pneumatic tire, a tread comprising a layer of rubber composition having a plurality of circumferentially extending grooves defining continuous ribs, a quantity of a water soluble inorganic halide salt interspersed as small particles in the layer, the size of said particles of halide salt being such that they will pass through a 10 mesh sieve but will be retained by a 20 mesh sieve, said quantity of halide salt being equal to from 20 to 40 per cent. of the weight of the rubber composition of said layer, and homogeneous layers of rubber composition secured to said tread at least in the regions of the bases of the grooves so as to completely enclose the water soluble particles adjacent said grooves within rubber composition.

EDWARD H. WALLACE.